United States Patent [19]

Clark et al.

[11] 3,940,059

[45] Feb. 24, 1976

[54] METHOD OF FOG DISPERSION

[75] Inventors: Richard S. Clark, China Lake, Calif.; Ronald L. Lininger, Ann Arbor, Mich.; David W. Reed, China Lake, Calif.

[73] Assignee: The United States of America as represented by the Secretary of the Navy, Washington, D.C.

[22] Filed: June 4, 1971

[21] Appl. No.: 150,205

[52] U.S. Cl. ............................................. 239/2 R
[51] Int. Cl.² ......................................... E01H 13/00
[58] Field of Search ........................... 239/2 R, 14

[56] References Cited

UNITED STATES PATENTS

| 2,052,626 | 9/1936 | Houghton, Jr. .................... 239/2 R |
| 3,595,477 | 7/1971 | Wollin et al. ........................ 239/14 |
| 3,613,992 | 10/1971 | Knollenberg ...................... 239/2 R |

*Primary Examiner*—John J. Love
*Attorney, Agent, or Firm*—R. S. Sciascia; Roy Miller

[57] ABSTRACT

A method of dispersing warm fog by forming a hygroscopic solution composed of urea and ammonium nitrate in water and spraying said solution into the fog cloud to be treated.

4 Claims, No Drawings

METHOD OF FOG DISPERSION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The deleterious effects of fog and low stratus on military activities are well known. Any capability to modify unfavorable weather has potential benefits for many segments of the military and civilian community. Research and development activities to modify warm fog have been conducted for more than three decades. The classical works with sprayed calcium chloride solution pointed a way to fog clearance. Nevertheless, the concepts of hygroscopic treatment of dry fog were not sufficiently developed in ensuing years to generate a reliable system. During World War II the heavy traffic of military aircraft at fog-bound bases in the United Kingdom led to the development and use of drying by thermal systems the direct application of the heat of combustion of petroleum fuels. Although this method did clear fog, there are many drawbacks, including immobility, cost, maintenance, pollution by smoke and water vapor, and the hazards of open flames near runways. The use of jet engines as a heat source has also been tested with varying results in warm fog. Although engineering developments might remove some of the drawbacks of a thermal system, one fundamental limitation remains. Each site where fog clearance is needed would require its own installation. Under most tactical conditions in the field, a capability is needed to take the treatment to the fog. A number of pyrotechnics generating ice nuclei have been developed for modifying cold clouds and cold fogs, also chemical smokes which theory suggests may have effects in warm clouds and fogs. The pyrotechnics used were of two general types: (1) airborne fused units, which are electrically fired and burned in place in a horizontal rack mounted behind the aircraft wing; and (2) large cylindrical units, which are burned on the ground. The present invention provides a method for injecting seeding nuclei of hygroscopic liquids into warm fog and stratus to give operationally useful clearings whereby an aircraft could take off or land.

DESCRIPTION OF THE INVENTION

The present invention relates to a method of dispersing warm fog.

In accordance with the present invention a hygroscopic solution comprising urea and ammonium nitrate dissolved in water in a ratio of from about 9:1 to 14:1 by weight solids-to-water was dispensed at the top of fog at approximately 1,500 feet. Vortices, troughs, and depressions occurred in the solution seeded areas.

For a better understanding of the invention several full tests are described introducing the hygroscopic solution into a fog cloud.

The composition of the test solutions used therein is set out as follows:

TABLE I

| Solution | HYGROSCOPIC COMPOSITION | | |
| --- | --- | --- | --- |
|  | Urea | Ammonium Nitrate | Water |
| 9:1 | 3 | 4 | 0.78 |
| 12:1 | 3 | 4 | 0.58 |

The solution was dispensed at the top of the fog (about 1,500 feet) on three tests. On one test with 9:1 solution, two sets of seeding passes were made wherein the aircraft sprayed solution one at 200 feet below the fog top and one at the top. When all the solution was dispersed at fog-top level, good results were obtained. Vortices, troughs, and depressions occurred in the seeded area. Another set of seeding passes were made using the 12:1 solution and ground observers reported a hole through which the sun could be seen after seeding.

A B-25 aircraft was modified by the addition of an agricultural-type spraying system for dispensing the present hygroscopic solution. Wind-driven pumps feed booms under each wing. A storage tank holds 1,000 gallons, but weight limits reduce usable loads to a lesser amount, depending on solution density. A solution of 4 parts by weight ammonium nitrate to 3 parts by weight urea was found to be promising, and solids-to-water ratios of as high as 14:1 were achieved for the chemically pure solution in the vicinity of 10 to 15° C.

Test results shown in Table II below indicate that the combination of urea and ammonium nitrate in a solids-to-water ratio of 9:1 yields a solution that is more effective than saturated solutions of the following single components: Ammonium nitrate, urea, sodium chloride, and calcium chloride. Water alone produces virtually no effect.

TABLE II

Airborne Results with Hygroscopic Sprays in Warm Fog or Stratus Clouds

| Material | Total tests by type | | Average effectiveness index (No. of tests) |
| --- | --- | --- | --- |
|  | Minor effects | Large effects |  |
| Ammonium nitrate solution | 0 | 7 | 1.6 (5) |
| Ammonium nitrate/urea/water (9:1 solution) | 0 | 9 | 2.3 (7) |
| Calcium chloride solution | 0 | 1 | 1 (1) |
| Sodium chloride solution | 1 | 1 | 1 (1) |
| Urea solution | 0 | 3 | 1.5 (2) |
| Water (river) | 4 | 0 | — |
| Water (sea) | 0 | 1 | 0 (1) |

The ammonium nitrate/urea/water system exhibits more solubility and hygroscopicity than either single-solute solution. It is a fertilizer and is noncorrosive to most metals, protected surfaces, and animal tissue.

What is claimed is:

1. A method for dispersing a warm fog which comprises spraying into said fog a composition comprising, on a molar ratio, about 1 mole urea and about 1 mole ammonium nitrate, with from zero to 5 moles of water, wherein the amount of water for said composition comprising two said compounds is at least one-half mole.

2. The method of claim 1 wherein said method comprises about 1 mole of urea, 1 mole of ammonium nitrate and at least about one-half mole water.

3. The method of dispersing a warm fog which comprises spraying into said fog fine droplets of a fluid comprising two compounds, urea and ammonium nitrate, wherein said fluid comprises less water than that required to form saturated solutions of said individual compounds.

4. The method of claim 3 wherein the molar ratio of said compounds to water is approximately 1:0.25 to 2.5.

* * * * *